United States Patent
Cunningham

[11] Patent Number: 5,666,832
[45] Date of Patent: Sep. 16, 1997

[54] GUARDS MAN

[76] Inventor: Sydney A. Cunningham, 1368 New York Ave., Brooklyn, N.Y. 11203

[21] Appl. No.: 437,411

[22] Filed: May 12, 1995

[51] Int. Cl.$^6$ .................................................. B60R 25/02
[52] U.S. Cl. ................................ 70/209; 70/238; 70/226
[58] Field of Search ........................ 70/209, 211, 212, 70/225, 226, 237, 238

[56] References Cited

U.S. PATENT DOCUMENTS

| | | | |
|---|---|---|---|
| D. 350,274 | 9/1994 | Baker | D8/331 |
| 5,025,646 | 6/1991 | Waguespack, Jr. | 70/209 |
| 5,115,652 | 5/1992 | Starmer | 70/226 |
| 5,275,030 | 1/1994 | Cole | 70/226 |
| 5,333,478 | 8/1994 | Chuang | 70/209 |
| 5,353,614 | 10/1994 | Anderson | 70/211 |
| 5,415,018 | 5/1995 | Ferrante | 70/226 |
| 5,450,736 | 9/1995 | Volkmer | 70/209 |
| 5,460,021 | 10/1995 | Taylor | 70/209 |
| 5,491,990 | 2/1996 | Von-Lambert | 70/209 |
| 5,540,067 | 7/1996 | Kim | 70/209 |

*Primary Examiner*—Darnell M. Boucher
*Attorney, Agent, or Firm*—Goodman & Teitelbaum, ESQS.

[57] ABSTRACT

A anti theft device for automobile steering wheel, designed for easily installation and removal, the device is fabricated from tempered steel and finish with the highest degree of craftsmanship. The sleeve envelops the steering wheel and its spokes for protection, the lock is housed on the inside of the sleeve housing, also for protection the protruding bar is attach to the housing permanently at that position. The lock cylinder is installed parallel to the steering wheel, this position protects the cylinder against chemical breach. The locking plate hinged to the under side of the housing, and operates like a slam lock. Provision is made on the device for additional security attachment if and when needed, using the additional attachment will double the security already offered by the device, and also gives the users a choice without changing from the security that this device offers.

5 Claims, 2 Drawing Sheets

GUARDS MAN

BACKGROUND OF THE INVENTION

This invention relate to a anti theft device, and more particularly a automobile steering wheel lock. This lock is designed to be install and remove as quickly and as easily as possible, yet provide the highest degree of security in the industry. Some of the device will be produce with modification to use additional security attachment, this creating a choice of two of the same device.

Automobile steering wheel lock are well known in the prior art, however, these prior art steering wheel locks are generally some form of elongated rod that is hook at some point across the steering wheel. From the number of breach carried out on the prior art each year by automobile thief, who cut through the device or the steering wheel; this show that the prior art has a vulnerability problem.

Unlike the prior art, The Guards Man was designed to overcome these weaknesses, by producing a device which make it impractical for any one to attempt a breach by cutting, or by applying any form of fource to remove the device. The device is made from tempered steel and is designed to envelop or wrap around a section of the steering wheel and the locking machenism, what make The Guards Man so secure is the fact that without the key to open the lock, there is no one place on the device or the steering wheel to which if it was cut would result in failure or removal of the device. The finish of the device will be of such high quality as to enhance each steering wheel, at a moderate cost.

SUMMARY OF THE INVENTION

It is accordingly an object of the present invention The Guards Man, which avoide the problem of the prior art devices.

Another object of the present invention The Guards Man, which provide the highest degree of security, that by cutting any one part of the steering wheel will not cause the security of the device to fail.

Another object of the present invention The Guards Man, which provide such security that by making a cut any where through both the sleeve and the steering wheel togather, will not cause a security failure of the device.

Yet another object of the present invention The Guards Man, which provide such security that cutting the steering wheel spoke or rod, will not breach the security of the device.

Still another object of the present invention The Guards Man, which provide such security that by cutting any one of the protruding bars will still leave the device security intact.

Another object of the present invention The Guards Man, is to produce two version of the device, and one version with an additional security lock up attachment.

Another object of the present invention The Guards Man, is to produce the same device, but this one without the additional security attachment.

Another object of the present invention The Guards Man, is to produce a device of high quality craftsmanship in a choice of two, at an affordable price.

Another object of the present invention The Guards Man, provide such high quality of security that by cutting the transverse bar and removing the additional security attachment that will still leave the security of the device fully intact.

Another object of the present invention The Guards Man, provide such security that the lock serve a dual purpose, one for the main device and also for the additional security attachment, by locking up the transverse bar.

Another object of the present invention The Guards Man, security is of such that when the security attachment is in use, to breach the cylinder and open the lock will not completely breach the device security; the additional attachment will fully maintain the security of the device until the transverse bar is release or cut.

Another object of the present invention The Guards Man, to meet the high security requirement a sleeve type housing is incorporated, which envelop that section of the steering wheel.

Another object of the present invention The Guards Man, since reliability is just as important as security, the protruding bars are fixed permamently to the sleeve housing.

Another object of the present invention The Guards Man, to maintain the standard of security the lock is installed inside the sleeve housing where it is inaccessible except for the key entry to the cylinder.

Another object of the present invention The Guards Man, the unit designed to used the additional attachment will work with or without it, without it the unit offer the same security protection as the unit designed to work without that attachment.

Another object of the present invention The Guards Man is such that the transverse bar not only serve as a security lock, but the end of the bar can be extended as a third protruding bar.

Another object of the present invention The Guards Man is to produce a device to fit the many size and shape of the different automobile steering wheel.

Another object of the present invention The Guards Man is to produce this device with the required size and strength while keeping the weight as light as possible.

Another object of the present invention The Guards Man is to provide protection for the airbag by using the attachment designed for it.

Another object of the present invention The Guards Man is to produce this device with two different security attachments to choose from, if and when needed.

BRIEF DESCRIPTION OF THE DRAWING

The above and additional objects and advantages in view, as will hereinafter appear, this invention comprises the devices combinations and arrangements of parts hereinafter described by way of example ane illustrated in the drawings of preferred embodiments in which.

DESCRIPTION OF THE PREFERRED EMBODIMENTS

Figure 1:
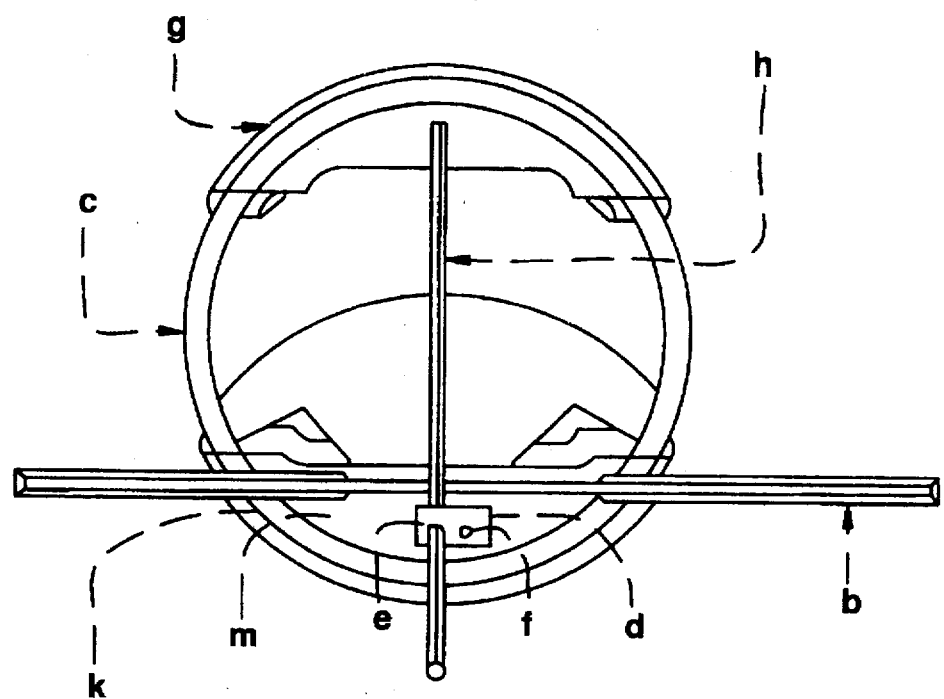
FIG. 1 show the device installed as it would appear on the steering wheel, complete with the additional security attachment, the additional security is provided by the sleeve connected to the transverse bar.

From the drawings we now see FIG. 1 showing the device. The Guards Man, a automobile steering wheel lock m in position on the steering wheel c. The main body of the device is the sleeve housing k which wrap around the steering wheel c with enough depth to cover two of the wheel spokes. The flange of sleeve k also accommodate the additional parts which make up the device, hence hereinafter describe as sleeve housing or k. There is a box d pressed out of the sleeve housing to receive the lock which is not shown, a hole e is provided through box d to receive the transverse bar h which will be lock in place by one part of the lock. A hole f is also provided in box d for the key entry to the lock cylinder, to maintain the high degree of security the lock is inaccessible except for the key entry f to the lock cylinder.

Figure 4:
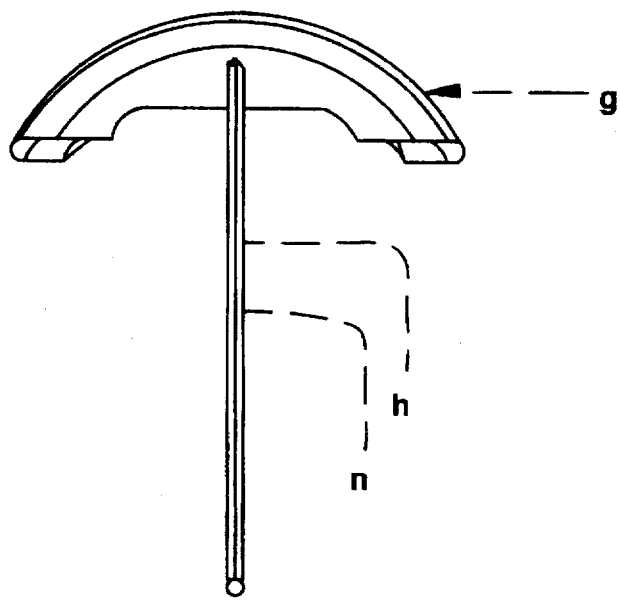
FIG. 4 showing the additional security attachment, this is fabricated from a section of sleeve connected to a transverse bar.

Additional security is provided by a section of sleeve g connected to a transverse bar h, this unit is shown at FIG. 4 and also in its working position at FIG. 1 the device m in FIG. 1 will work safely with or without the attachment at FIG. 4 omitting this attachment some time from the device will not compromise the security of the unit.

Figure 2:
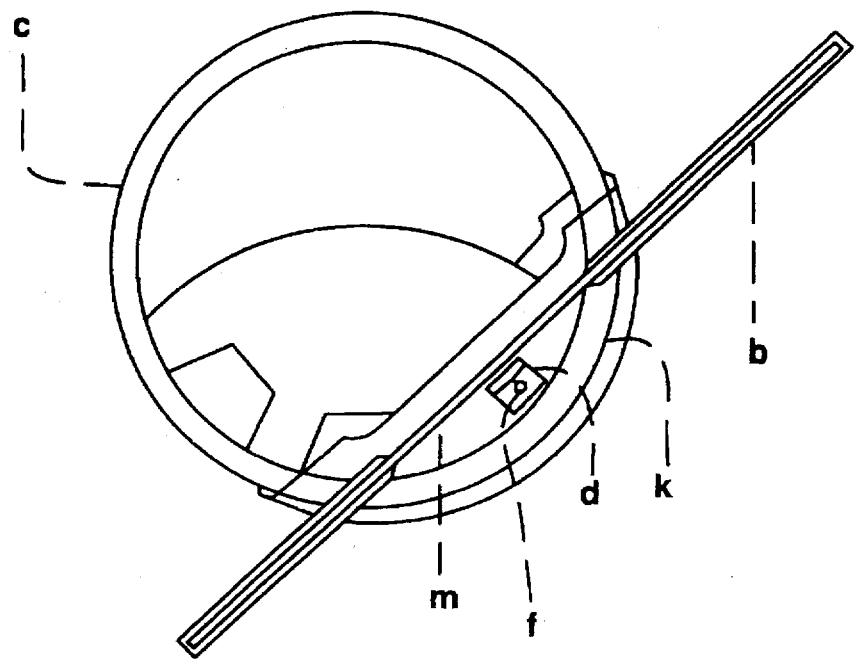
FIG. 2 show the same device as that shown in FIG. 1 but without the additional security attachment, this show the choice the users have.

The same device m is shown at FIG. 2 with the exception that box d has no provision for any additional security, therefore the attachment in FIG. 4 which also used in FIG. 1 cannot be use on FIG. 2 This give the users a option of whether to use the device of FIG. 1 or FIG. 2 whichever device is use the security offer is very high, the security offer is also most effective when the device is lock between two spokes or bars radiating from the hub of the wheel.

Figure 3:
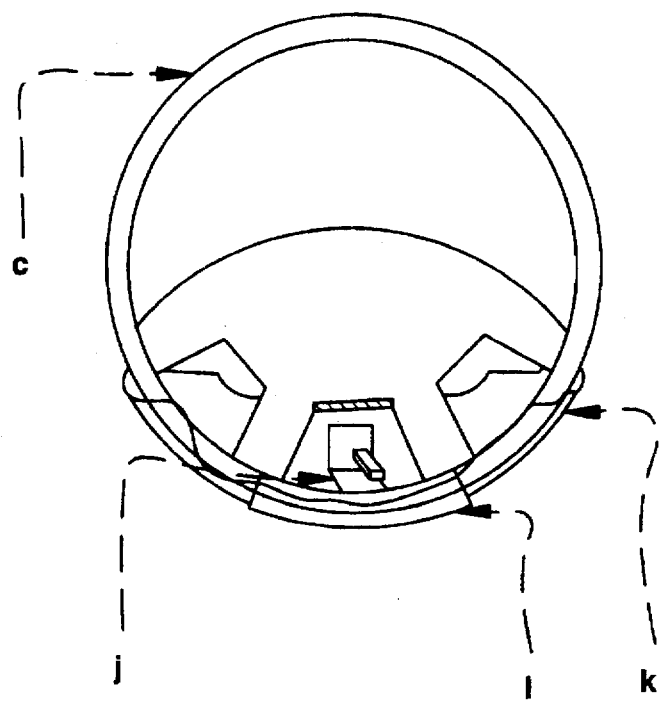
FIG. 3 showing the underside of the locking plate which is on both devices.

To safeguard against chemical breach, the lock cylinder at f is installed parellel to the wheel c so that most time the key entry to the cylinder is pointing downword. FIG. 3 shows the under side of k in FIG. 1 and FIG. 2 respectively, j show the locking plate or locking mechanism, the end of the plate j form a right angle which lock against the inside of wheel c and form the locking bolt for the device. In FIG. 3 notice that j is in the position that will not allow the device to be remove from wheel c until j is release from behind wheel c, also the position of the lock between the two spokes, mean that lateral movements are reduce to a minimum.

Figure 5:
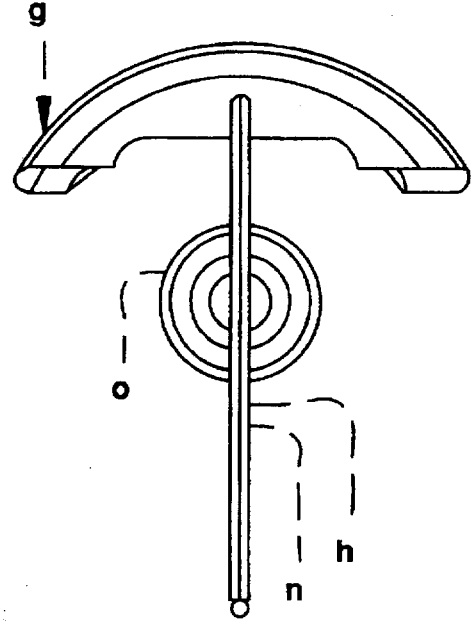
FIG. 5 show one of the security attachment with a steel disc plate fixed to the transverse bar, this provide airbag protection.

In FIG. 3. 1 is a reinforcing tempered steel plate which may be use to protect the area around the lock if the material from which the device is made is not hard enough. FIG. 4 show the additional security attachment made up of sleeve g and a transverse bar h, to install the bar h is first put through hole e while sleeve g is lower over wheel c, when g is fully in position the locking bolt on that side of the lock in box d of FIG. 1 will intersect with notches made for that purpose. These locking holes are at n on bar h; In position the end of this rod may well serve as a third protruding bar. FIG. 5 show the additional attachment with a steel plate o fixed to the transverse bar, this plate is to protect the airbag.

What is claimed is:

1. An automobile anti-theft device for use on an automobile steering wheel provided with at least two spaced apart spokes, comprising:

housing means for enveloping a portion of the steering wheel and the two spaced apart spokes therein;

said housing means being provided with an attached elongated housing bar extending outwardly from opposing sides thereof;

said housing means being disposed in a first plane, and said housing bar being disposed in a second plane parallel to said first plane, opposite ends of said housing bar extending outwardly in said second plane beyond said housing means so that when said housing means is secured on the steering wheel, said opposite ends of said housing bar extend outwardly beyond opposing sides of the steering wheel to obstruct any turning of the steering wheel;

a lock for securing said housing means to the steering wheel in a locked condition, said lock including bolt means for extending between the two spaced apart spokes in a perpendicular position thereto to prevent removal of said housing means from the steering wheel when said lock is in said locked condition;

sleeve means for enveloping an opposite portion of the steering wheel, said sleeve means being provided with an attached elongated sleeve bar extending transverse outwardly from a central portion of said sleeve means;

said lock including engagement means for engaging a free end portion of said sleeve bar to secure said sleeve means on the opposite portion of the steering wheel with said sleeve bar being secured in a transverse position relative to said housing bar; and said sleeve bar being provided with disc means to prevent removal of an air bag mounted in the steering wheel, said disc means including a disc attached to said sleeve bar at a predetermined position in order to cover the air bag.

2. An automobile anti-theft device according to claim 1, wherein said housing means includes an outer side and an inner side connected together by a bight portion to provide a U-shaped body, said outer side having a substantially semi-circular configuration with said bight portion being curved to receive a peripheral portion of the steering wheel, said U-shaped body having a deep cavity to cover both the steering wheel and the two spaced apart spokes for protection thereof, said housing bar being attached to said outer side.

3. An automobile anti-theft device according to claim 1, wherein said housing means includes a box to house said lock in an inaccessible arrangement so that only a hole is provided in said box for allowing a key to pass through for activating a lock cylinder of said lock to extend and retract said bolt means.

4. An automobile anti-theft device according to claim 1, wherein said housing means is provided with aperture means for receiving said free end portion of said sleeve bar there through to maintain said sleeve bar in position relative to said engagement means of said lock.

5. An automobile anti-theft device according to claim 1, wherein said sleeve means includes an outer side and an inner side connected together by a bight portion to provide a U-shaped body, said outer side having a substantially semi-circular configuration with said bight portion being curved to receive said opposite portion of said steering wheel, said U-shaped body having a deep cavity to cover said opposite portion of said steering wheel for protection thereof, said sleeve bar being attached to said outer side of said U-shaped body.

* * * * *